Aug. 22, 1933.  H. G. HEDDE  1,923,373
AUTO BRAKE TESTING DEVICE
Filed July 29, 1932
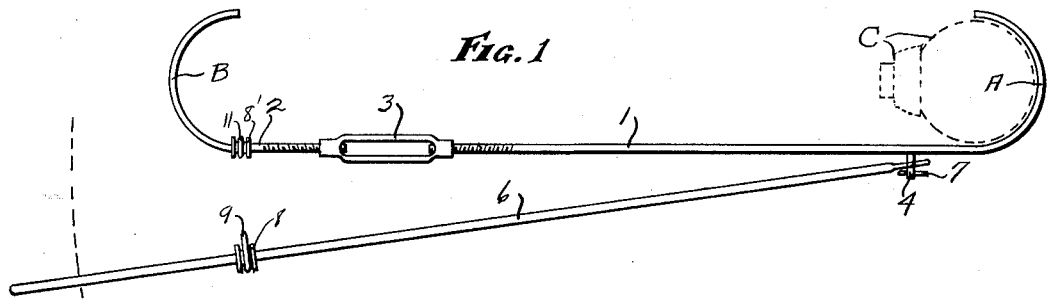
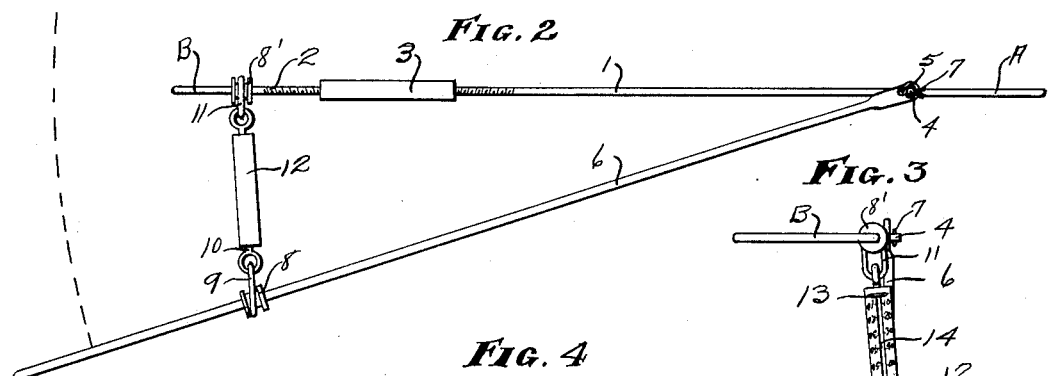
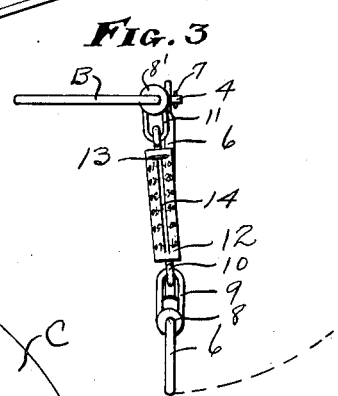
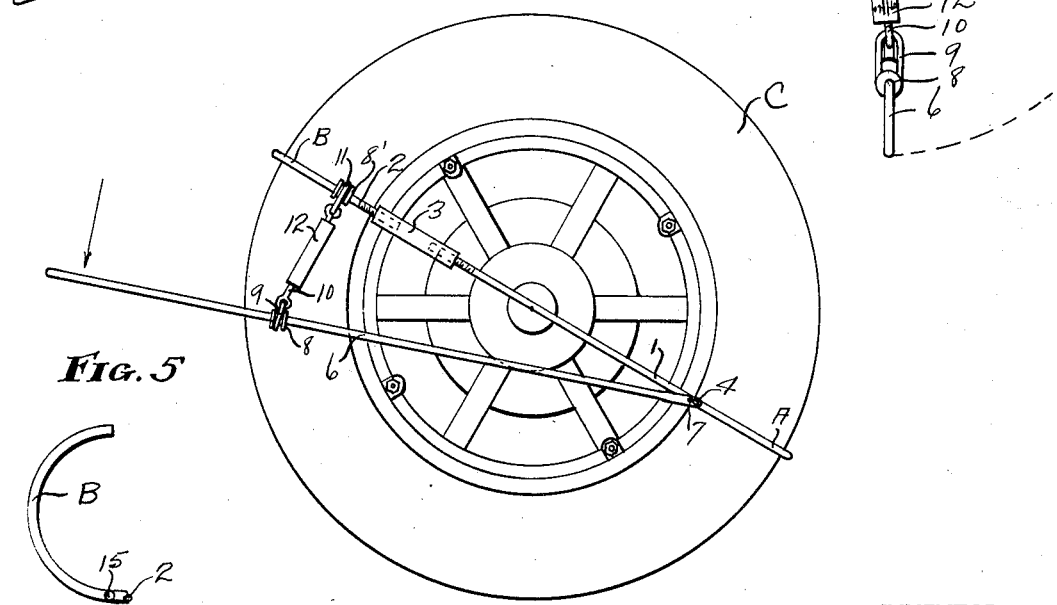
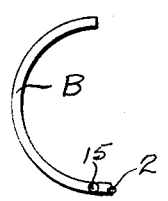
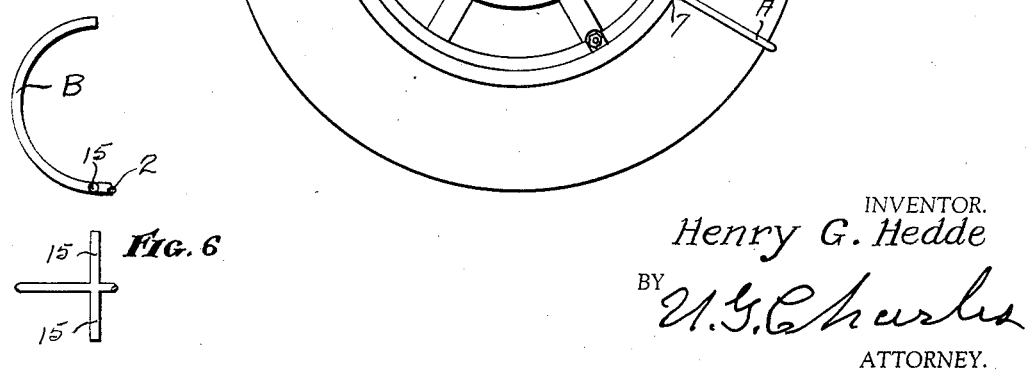
INVENTOR.
Henry G. Hedde
BY U. G. Charles
ATTORNEY.

Patented Aug. 22, 1933

1,923,373

UNITED STATES PATENT OFFICE 1,923,373

AUTO BRAKE TESTING DEVICE

Henry G. Hedde, Rosalia, Kans.

Application July 29, 1932. Serial No. 625,913

3 Claims. (Cl. 265—1)

My invention relates to improvements in auto brake testing devices.

The object of my invention is to provide a simple and efficient device, which may be quickly applied and secured rigidly to a wheel of a motor driven vehicle, and which will indicate exactly in pounds or in fractions thereof, the frictional action under which the brakes are set whereby each of the four wheels will have equal tension when the brake is applied, and by means of the brake adjustment the rear wheels may be set with a greater tension than the front wheels which is preferable.

A further object of my invention is to provide a device adjustable to wheels of varying diameters.

A still further object of my invention is to provide a manipulating lever operative in either direction of rotation, and carrying therewith a scale readable to the operator regardless of the position.

A still further object of my invention is to provide a simple and efficient means to avoid twisting the clamp when the power of the lever is applied in either direction.

A still further object is to provide a mechanism that is easily dis-assembled, requiring but small space for storage along with other tools commonly employed by auto owners and stored within the car.

These and other objects will hereinafter be more fully explained, reference being had to the accompanying drawing forming a part of this specification, and in which like characters will apply to like parts in different views.

Referring to the drawing:—

Fig. 1 is a top view of the device.

Fig. 2 is a side view of Fig. 1.

Fig. 3 is an end view facing the scale showing the possible rock of the lever by a dotted line.

Fig. 4 is a view of the device clamped to a vehicle wheel in operative position.

Figs. 5 and 6 are associate views illustrating the modification of the device.

The invention disclosed consists of a rod 1, having a hook A integral therewith and a second rod 2 of shorter length and a hook B integral therewith, the adjacent ends of said rods are threaded to receive a turn buckle 3, as connecting means therefor and by which means the distance between the hook elements may be varied. Laterally extending and integrally joined is a pin 4 positioned in close proximity to hook A, and on which the aperture 5 of a lever 6 will loosely engage, but secured thereon by a cotter pin 7, by which means the said lever is free to rock vertically and horizontally for the purpose later described.

Spaced a short distance from the free end of the said lever is a pair of annular stops 8 spaced apart and between which will loosely engage the loop of a link 9, and pivotally engaging with the scale bar 10, the upper end of the scale is secured rockably on rod 2 through the medium of a link 11, that is held in position by a pair of stops 8', similar to the first said stops, by which means the said lever may be positioned above or below the axis of rods 1 and 2, as turning means for a wheel to which the device is attached to turn the same in a desired direction carrying the scale 12 therewith.

The position of the tire is shown by a dotted line C in hook A but not shown in hook B. The scale has a double pointed indicator 13 that moves along a row of graduations on each side of slot 14, the numerals on one graduation are inverted with respect to the other so that the pounds and fractions thereof are easily read regardless of the position of the scale as controlled by the lever position.

In Fig. 4 is shown the device clamped to the tire C of a wheel, the lever rocked to the lower side as means to rotate the wheel anti-clockwise by pressing downward on said lever, the movement being for the forward travel for the wheels of the left side of the car.

The method of equalizing the brake friction for all of the wheels is to set the foot brake securely, and place the device on a wheel and adjust the brake tension to resist the same number of pounds or fraction thereof on each wheel, in other words adjust one wheel at a time and as previously stated vary the tension between the front and rear wheels.

As a modification to avoid twisting of the hooks under the tension of the lever, I have arranged a pair of laterally extending bars 15, oppositely extending and transverse to the horizontal plane of the hook elements; the said bars snugly engaging on the side of the tire to avoid rotation of the rod elements, when tension is applied by the lever, and such other modifications may be employed as lie within the scope of the appended claims. Having fully described my invention, what I claim as new and desire to secure by Letters Patent is:—

1. In a brake testing device, a pair of rods, axially aligned, each rod having a hook on the outer end thereof, the rods threadedly connected by a turn-buckle to vary the distance between the hooks, a lever pivotally engaging with one rod, and a scale connecting the free end of the lever with the other rod.

2. In a brake testing device, a pair of rods and a turn-buckle threadedly connecting the rods, as adjusting means for the same longitudinally, each rod having a hook on the outer end thereof to engage on the tire of a wheel, snugly tensioned by the turn-buckle, a lever pivotally mounted on one of the rods in close proximity to the hook, and a scale having one end rockably carried by the lever, and the other end rockable on the other rod, as turning and weighing means for the brake tension of a wheel.

3. In a brake testing device, a pair of hook elements to engage on the periphery of the tire of a wheel, and a rod tangently connecting to each hook a turn-buckle threadedly connecting the ends of the rods as tensioning means for the hooks on the tire, a lever having one end pivotally joined in close proximity to one of the hooks, and a scale connecting the other end in close proximity to the other hook in such a way that the lever is rockable from one side to the other of the hooks, and their respective rods, by which means the wheel brake resistance may be gauged when the wheel is turned in either direction.

HENRY G. HEDDE.